L. H. Foy,
Skirt Supporter.
No. 2654. Reissued. June 18. 1867.
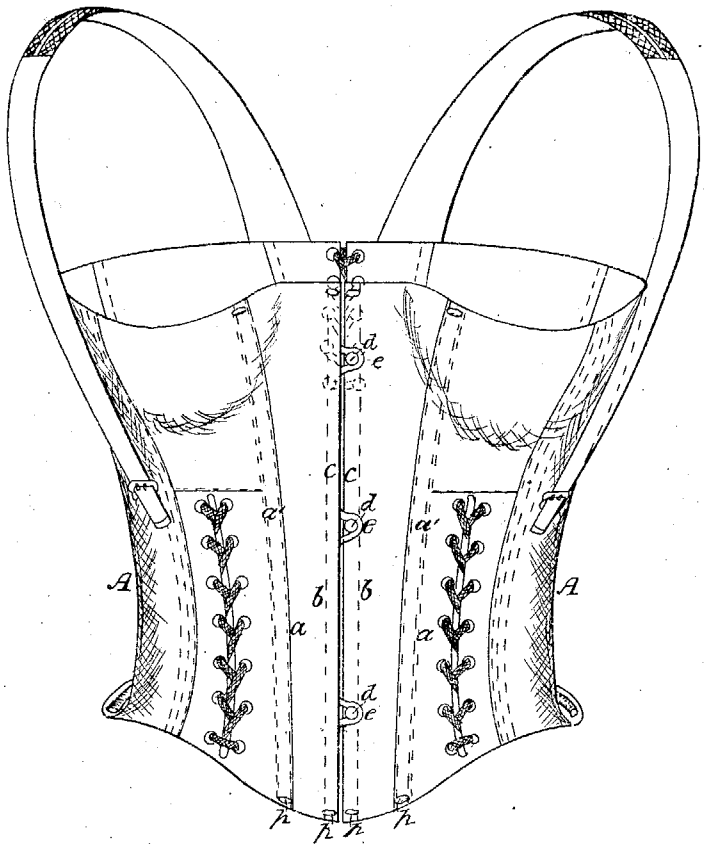
Witnesses { C. F. Lay
George Ames
Inventor Lavinia H. Foy

United States Patent Office.

JAMES H. FOY AND LAVINIA H. FOY, OF BOSTON, MASSACHUSETTS, ASSIGNEES BY MESNE ASSIGNMENTS OF LAVINIA H. FOY.

*Letters Patent No.* 39,911, *dated September* 15, 1863; *reissue No.* 2,654, *dated June* 18, 1867.

DIVISION 2.

IMPROVEMENT IN CORSET SKIRT-SUPPORTERS.

The Schedule referred to in these Letters Patent and making part of the same.

TO ALL WHOM IT MAY CONCERN:

Be it known that I LAVINIA H. FOY, of Boston, in the county of Suffolk, and Commonwealth of Massachusetts, but formerly of the city and county of Worcester, in said Commonwealth, have invented certain new and useful Improvements in Corset Skirt-Supporters; and I do hereby declare that the following is a full, clear, and exact description of the same, reference being had to the accompanying drawings, forming a part of this specification.

To enable those skilled in the art to which my invention belongs to make and use the same, I will proceed to describe it more in detail.

The accompanying drawing represents a front view of my improved corset skirt-supporter, which is fully described in another specification for a patent of even date herewith; and therefore only so much of the corset skirt-supporter shown in the accompanying drawing will be described as is necessary to explain and illustrate the subject-matter covered by the claims in this division of my invention, and which relates to a method of fastening in place the stiffening whalebones, or springs made of metal or other material, or of so protecting the ends of such bones or springs that they cannot slip or wear through the pockets in which they are placed or enclosed.

As the bodies of corsets and corset skirt-supporters were made prior to my present invention the ends of the bones or springs were generally secured in place by stitches; but the bones or springs soon broke the stitches or wore through the fabric, so that their edges would catch upon and tear the apparel with which they came in contact.

To obviate the above and other objections to the old modes of protection I cover each end of each bone or spring with a flattened metal cap, the inner surface of which fits over the fabric upon the outer side of the end of the bone or spring, while a flange turned down from the edge of the cap fits against the end and edges of the bone or spring, the cap being fastened in position, in this instance, by small spurs, which project from the flange, and are forced through the corset fabric, and are clinched upon the inner side of the fabric or body of the corset.

In the drawings, A is the body of the article to which my invention is applied in this instance; *a a* are the side pockets to receive the stiffening springs or whalebones *a' a'*, shown in dotted lines; and *b b* are the central pockets. The metal springs *c c*, inserted in the central pockets as shown in dotted lines, are made, in this instance, to answer the purpose of clasps, by means of which the corset is fastened in front, as indicated in the drawing. This is effected by providing one spring with projections *d* to fit into the loops *e* on the other spring. After the stiffening springs, of whatever material made, have been inserted in their respective pockets, the caps *p* are applied so as to cover and protect their ends, in the manner substantially as above described. The caps may be made or cut and struck up by proper dies prepared for the purpose.

The caps are easily applied, and, while materially improving the article to which they are applied, do not add much, if anything, to the cost of the corset, the body of which is much more enduring than it was when the ends of the stiffeners or springs were fastened by stitching, as before explained, while the wearer is saved from the annoyance attending the derangement or protrusion of the ends of the whalebones or springs.

Having described my improvement, what I claim as new and of my invention, and desire to secure by Letters Patent, is—

1. Protecting and securing the ends of the stiffeners, whalebones, or springs, which are inserted in pocket in the body of corsets, by means of caps *p*, the body, flange, and spurs of each of which confine the stiffener or spring in position, and prevent its wearing through the fabric, substantially as set forth.

2. Protecting and securing the ends of the stiffeners, whalebones, or springs, which are inserted in pockets in the body of a corset, by means of metal caps applied to the outside of the corset, to prevent the said stiffeners from wearing through the fabric, substantially as described.

LAVINIA H. FOY.

Witnesses:
C. S. LANE,
GEORGE AMES.